Sept. 19, 1939.　　　T. B. SLISZ ET AL　　　2,173,815
HEAT INSULATING MATERIAL AND METHOD OF FORMING THE SAME
Filed May 19, 1937
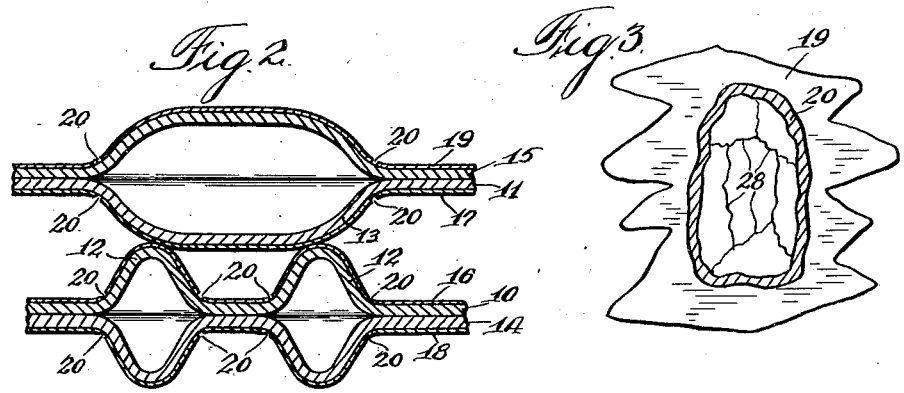
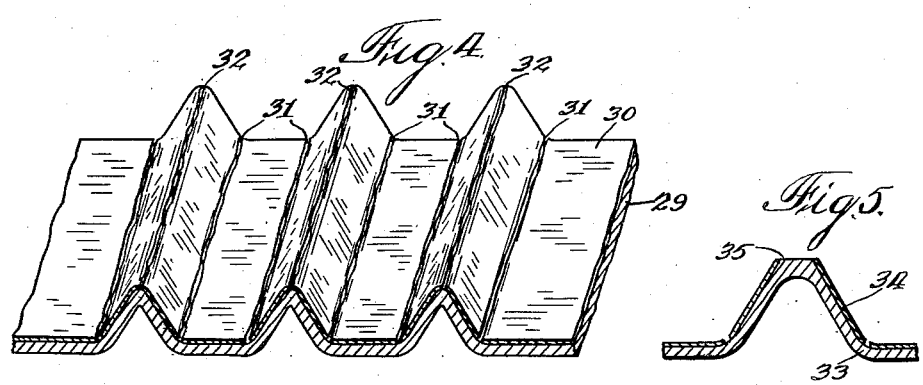
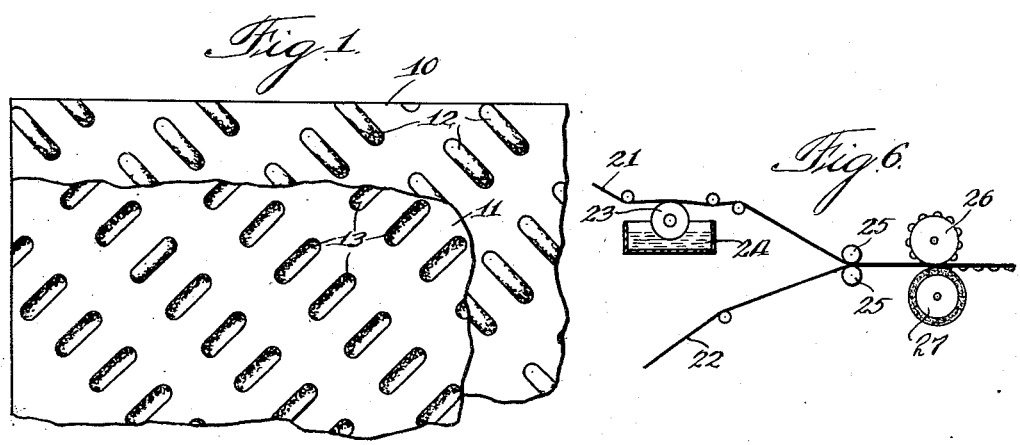
Inventors:
Theodore B. Slisz
and Clyde C. Schuetz
By Ams, Thiro, Olson+Mecklenburger Attys Patented Sept. 19, 1939

2,173,815

UNITED STATES PATENT OFFICE 2,173,815

HEAT INSULATING MATERIAL AND METHOD OF FORMING THE SAME

Theodore B. Slisz and Clyde C. Schuetz, Chicago, Ill., assignors to United States Gypsum Company, Chicago, Ill., a corporation of Illinois Application May 19, 1937, Serial No. 143,486

18 Claims. (Cl. 154—28)

Our invention relates to heat insulating materials and methods of forming the same. More particularly, our invention relates to laminated air-cell insulating materials of the type comprising a plurality of laminations, corrugated, indented, or embossed to provide an effective insulation thickness several times the true thickness of the laminations, and to methods of producing insulating materials of this character, and has for an object the provision of an improved method and article of this character.

Laminated air-cell insulation has heretofore been provided in which adjacent laminae are corrugated or indented and arranged so that the corrugations or protuberances on adjacent sheets support the sheets in spaced relation so as to provide spaced air-cells therebetween. In structures of this character, the effective insulation to the flow of heat at right angles to the laminae varies in different portions of the structure due to the fact that the laminae at some points are in direct engagement, and at other points are in spaced relation. Naturally, a smaller flow of heat due to conduction occurs in those portions where the laminae are spaced, than in those portions where the laminae are in direct engagement, and since the laminae are usually formed from heat insulating materials so that very little heat flow occurs along the laminae, the effective insulation against the flow of heat by conduction at right angles to the laminae is greater than if the entire surface of the laminae were in face to face engagement.

In some cases it has been found desirable to provide the laminae with highly reflective metallic coatings on one or both surfaces so as to minimize the transfer of heat by radiation. Difficulty is encountered, however, in using reflective coatings of this character due to the fact that these coatings are formed of highly conductive material, and accordingly conduct heat along the surfaces of the laminae from the portions having a low conductivity at right angles to the laminae, to the portions having a relatively high conductivity to a flow of heat in this direction. In order to overcome this defect it has been proposed to form the reflective coating by depositing on the surfaces of the insulating laminae coatings formed from a plurality of metal flakes, the flakes being spaced from each other so as to provide a discontinuous coating. Coatings of this character are not entirely satisfactory, however, due to the difficulty in maintaining the proper spacing of the particles or flakes, and due to the fact that such a coating has a much lower reflectivity than a continuous coating formed, for example, from a sheet of metal foil.

Accordingly, it is a further object of our invention to provide heat insulation of this character having reflective coatings on the laminae, the coatings being ruptured at predetermined points to prevent the conduction of heat therealong, and it is also an object of our invention to provide an improved method for producing heat insulating materials of this character, in which materials the transmission of heat by convection, radiation, and conduction is reduced to a minimum.

In carrying out our invention in one form, the improved heat insulating material is formed by applying to an insulating base member a coating of a material having a lower rupture point than the base member when subjected to elongation, and thereafter indenting the base member to a depth sufficient to cause rupture of the coating material adjacent the indentations. More specifically, a substantially flat sheet of fibrous insulating material is adhesively secured to a sheet of metal foil and is thereafter subjected to a pressing operation, to form indentations therein of sufficient depth to effect rupture of the foil adjacent the base of the indentations so as to separate the foil on the crowns of the protuberances from the foil on the remainder of the sheets of insulating material. A plurality of these indented sheets are arranged in face-to-face relation so that the crowns of the protuberances on one sheet engage similar protuberances on the adjacent sheet to provide air-cells therebetween, the ruptures in the foil coating preventing the conduction of heat therealong between the engaging protuberances and the spaced portions of the sheets. In accordance with a further aspect of our invention, the foil coated sheets after being indented are subjected to an abrasive action for removing a portion of the foil on the crowns of the protuberances so as to prevent metal-to-metal contact when a plurality of the indented sheets are arranged with the protuberances in face-to-face relation.

For a more complete understanding of our invention reference should now be had to the drawing, in which:

Figure 1 is a fragmentary plan view of a laminated insulating structure embodying our invention;

Fig. 2 is an enlarged cross sectional view taken along the line 2—2 of Fig. 1;

Fig. 3 is an enlarged plan view of one of the protuberances of an insulating structure embodying our invention;

Fig. 4 is a perspective view of another form of insulation material embodying our invention;

Fig. 5 is a fragmentary cross sectional view of a still further embodiment of our invention; and Fig. 6 is a diagrammatic representation of one form of apparatus for carrying out our improved method of forming insulating materials embodying our invention.

Referring now to the drawing, we have shown in Fig. 1 a laminated insulating material of the type broadly described and claimed in a co-pending application of Clyde C. Schuetz, Serial No. 140,343, filed May 3, 1937, entitled Heat insulation. As is more fully described in the said Schuetz application, the insulating structure comprises a plurality of laminations or sheets 10 and 11 each of which is indented from one side to provide a plurality of elongate protuberances 12 and 13 on the opposite side, the protuberances being arranged in rows with the long dimension of each protuberance extending obliquely with respect to the edges of the sheets, the long dimension of each protuberance being greater than the spacing between the rows of protuberances.

As shown, the indented sheets 10 and 11 are arranged in reversed relation so that the protuberances 13 on the sheet 11 extend downwardly to engage the upwardly extending protuberances 12 on the sheet 10, and so that the rows of protuberances on the respective sheets extend at a substantial angle to each other. Thus the rows of protuberances on the sheet 10 slope upwardly to the left, as viewed in Fig. 1, and the rows of protuberances on the sheet 11 slope upwardly to the right, as viewed in Fig. 1. In accordance with our invention the adjacent faces of the sheets 10 and 11, as will be more fully described in connection with Figs. 2 and 3, are provided with a reflective coating, and the depth of the indentations is sufficient to rupture the reflective coating adjacent the base of each of the protuberances.

Referring now to Fig. 2, the insulating structure as there shown comprises, in addition to the indented sheets 10 and 11, a second pair of similar indented sheets 14 and 15, the sheet 14 being arranged in face-to-face relation with the sheet 10 and the sheet 15 being similarly arranged in face-to-face relation with the sheet 11, so that the indentations in the respective sheets cooperate to provide a plurality of dead air spaces between the sheets 10 and 14, and 11 and 15, respectively, the protuberances 12 and 13 on the sheets 10 and 11 being in engaging relation, as shown, so as to support the sheets 10 and 11 in spaced relation. As stated above, each of the indented sheets is provided with a reflective coating which may be of any desired character, and which may be applied to the sheets in any desired manner. In Fig. 2 these coatings are shown, for purposes of illustration, as comprising a plurality of sheets of metal foil 16, 17, 18, and 19, respectively.

It will be apparent upon inspection of Fig. 2, that the portions of the sheets 11 and 15, which are directly in face-to-face engagement, offer considerably less resistance to the flow of heat therebetween by conduction than do the portions of the sheets which constitute the protuberances and are, accordingly, spaced from each other. Likewise, the same is true of certain portions of the sheets 10 and 14. In accordance with our invention, therefore, the sheets of metal foil 16 to 19, inclusive, are ruptured at the points indicated by the reference numerals 20 adjacent the base of each of the protuberances, so as to prevent the conduction of heat along the foil sheets from the protuberances which constitute portions of low heat conductivity, to the flat parts of the sheets which constitute portions of relatively high heat conductivity. As will be explained more fully hereinafter, these ruptures in the metal foil are formed by indenting the sheets to a depth sufficient to so elongate the foil as to cause rupture thereof without causing rupture of the insulating sheets themselves.

It will be understood, of course, that the separate sheets are indented prior to assembly to form the insulating structure shown in Fig. 2, and although this indentation may be accomplished in any desired manner and with various types of apparatus, we have shown in Fig. 6, for purposes of illustration, what may be considered in some cases a preferred form of apparatus for carrying out our improved method of forming insulation of this character.

Referring now to Fig. 6, a suitable sheet 21 of fibrous material such, for example, as paper or asbestos, and sheet 22 of suitable metal foil, are simultaneously drawn from suitable supply rolls (not shown), and the fibrous sheet 21 is passed over an adhesive applying roll 23 so that the lower surface thereof is coated with a layer of adhesive material. The adhesive applying roll 23 is of the type well known in the art and is arranged, as shown, to rotate in a suitable bath of liquid adhesive material 24, which is preferably sodium silicate or a similar water-containing adhesive.

After the adhesive has been applied to the lower surface of the sheet 21, the sheets 21 and 22 are passed through a pair of pressure rollers 25 so as adhesively to secure the sheets together, and the composite sheet is then passed through a pair of indenting rolls 26 and 27 which may be of any suitable type. As shown, the roll 26 is provided with a plurality of indenting beads or protuberances, and the roll 27 is provided with a soft covering surface such, for example, as soft rubber, into which the composite sheet is pressed by the indenting beads to form indentations in the composite structure comprising the adhesively united sheets 21 and 22 as these sheets pass between the indenting rolls.

As indicated above, the metal foil sheet 22 faces the soft rubber surface of the roll 27, and the spacing of the rolls and the character of the rubber surface are so correlated as to produce an indentation of sufficient depth to cause rupture of the metal foil at the base of each of the protuberances formed in the composite sheet without causing rupture of the fibrous sheet 21. Various types of rubber or similar covering surface may be utilized but it will be understood that the pressure exerted by the rolls 26 and 27 must be carefully predetermined with respect to the particular soft covering used. Thus with a relatively hard rubber we have found that a pressure of approximately 100 pounds per square inch is necessary to obtain sufficient penetration to rupture the metal foil without rupturing the fibrous sheet, while with very soft sponge rubber a pressure of only 5 pounds per square inch will effect satisfactory indentation.

It will of course be understood that our invention is not limited to the particular apparatus shown, as our improved method may, if desired, be carried out by pressing the composite sheet formed by the fibrous base 21 and the metal foil 22 between a flat plate or die having proper indenting beads on one surface and a receiving base having a soft rubber surface, the pressure exerted on the composite sheet again being so correlated with the rubber surface as to provide for rupture of the foil at the base of each indentation without rupturing the fibrous sheet.

In place of the rubber covered roll 27, or in place of the rubber covered receiving base described above, a properly indented female roll or die may be employed having recesses into which the beads of the indenting roll or plate extend to provide proper indentation of the foil covered sheets. Where cooperating male and female rolls are utilized the pitch of the forming teeth or beads on the male roll must be so correlated with the recesses in the female die as to provide proper clearance therebetween and ensure that there will be no binding and tearing of the fibrous sheet.

Furthermore, if desired, the metal foil may be perforated or slit either prior or subsequent to being adhesively secured to the fibrous sheet so that when the composite sheet is passed through properly synchronized embossing rolls, the perforations form gaps between the foil on the flat portions of the sheet and the foil on the protuberances, the foil on the protuberances being forced outwardly during the indenting operation.

As shown in Fig. 3, which is a top view of the sheet 15 of Fig. 2, when the insulation is formed by proper indenting dies or rolls the ruptures 20 in the foil sheet 22 extend entirely around the base of each protuberance so as to completely isolate the foil on the crown of the protuberance from the foil on the remainder of the sheet. We have found that in actual practice numerous small hairline cracks, as indicated by the reference numeral 28 in Fig. 3, may be formed in the foil on the crown of the protuberance, and these hairline cracks which may or may not be joined in the manner shown provide an interrupted or discontinuous foil covering on the various protuberances.

In Fig. 4 we have shown a somewhat different type of heat insulating material embodying our invention. As here shown, the insulating material comprises a base member or sheet of fibrous material 29 which is provided with a coating of metal foil 30 and corrugated, as shown, the depth of corrugation being sufficient to rupture the metal foil 30 along the base of the corrugations as indicated by the reference numerals 31. As shown the metal foil may also be ruptured along the crest of each corrugation, as indicated by the reference numerals 32, although rupture along the crests may be prevented, if desired, by proper design of the corrugating apparatus. It will be apparent, therefore, that when a plurality of corrugated sheets of this character is assembled together or provided with suitable covering members, the transfer of heat from the crowns of the corrugations to the flat surfaces therebetween by conduction along the metal foil is substantially prevented by the ruptures in the foil. Corrugated sheets of the character here shown may of course be formed in the manner described above by providing corrugating dies or rolls having proper corrugating beads on the surfaces thereof.

While we have described our invention in connection with metal foil coatings, it should be understood that our invention is not limited thereto, since the reflective metallic coating may be applied to the insulating base members in any suitable manner as, for example, by spraying or otherwise depositing suitable metal thereon, and our invention, furthermore, is not limited to structures in which metallic coatings are used. In some cases it may be desirable to provide non-metallic coatings which may have a higher heat conductivity than the base member, and so long as these coatings have a lower rupture point than the base member, materials embodying our invention may be formed simply by indenting the base member to a depth sufficient to cause rupture of the coating material. The term "lower point of rupture", as used herein, is understood to mean that the material, when subjected to elongation, ruptures before the base member itself is elongated sufficiently to cause rupture thereof.

In some cases it may be desirable to remove from the crowns of the corrugations or protuberances a portion of the metallic coating, so as to further reduce the conduction of heat between adjacent indented membranes or sheets. This removal of the metallic coating may be accomplished in accordance with our invention simply by subjecting the indented sheet to a slight abrasive action as, for example, by means of wire brushes or carborundum wheels, the abrasive material being allowed to contact only the apex or crown of the indentations, so as to remove therefrom the metallic coating, as shown in Fig. 5. Thus, in Fig. 5, we have shown an indented or corrugated sheet 33 having a foil coating 34 applied thereto, the portion of the foil coating which would normally cover the crest of the indentation or corrugation having been removed by abrasive action so as to expose the base member 33 at the point indicated by the reference numeral 35. Preferably the indented sheet 33 is supported on a roll of comparatively small diameter during the abrasive treatment so as to expose a larger portion of the apex of each protuberance to the action of the abrasive device.

While we have shown particular embodiments of our invention, it will be understood, of course, that we do not wish to be limited thereto since many modifications may be made and we, therefore, contemplate by the appended claims to cover any such modifications as fall within the true spirit and scope of our invention.

Having thus described our invention, what we claim and desire to secure by Letters Patent is:

1. The method of producing insulating materials which comprises adhesively securing a sheet of metal foil to an insulating base member, and thereafter indenting said base member to a depth sufficient to cause rupture of said metal foil adjacent said indentations.

2. The method of producing insulating materials which comprises applying to an insulating base member a thin reflective coating having a lower rupture point than said base member, and thereafter indenting said base member to a depth sufficient to cause rupture of said thin reflective coating adjacent said indentations.

3. The method of producing insulating materials which comprises adhesively securing a sheet of metal foil to an insulating base member and thereafter corrugating said base member to a degree sufficient to cause rupture of said foil along said corrugations.

4. The method of producing insulating materials which comprises applying to an insulating base member a thin coating of a material having a lower point of rupture than said base member and thereafter corrugating said base member to a degree sufficient to cause rupture of said thin coating along said corrugations.

5. The method of producing insulating materials which comprises applying to a substantially flat base member a coating of material having a lower rupture point than said base member when subjected to elongation, and thereafter indenting said base member from the side opposite from said coating to provide protuberances on said coated surface, the depth of indentation being sufficient to rupture said coating along the edges of said protuberances.

6. The method of producing insulating materials which comprises adhesively securing to a substantially flat base member a sheet of metal foil having a lower rupture point than said base member when subjected to elongation and thereafter indenting said base member to provide protuberances on the foil coated surface thereof, the depth of indentation being sufficient to rupture said foil along the edges of said protuberances.

7. An insulating material comprising a base member and a sheet of metal foil secured to one surface thereof, said surface having a plurality of protuberances and said sheet of foil being ruptured along the edges of said protuberances to provide a discontinuous coating on said base member.

8. An insulating material comprising a base member and a thin metallic coating thereon, the coated surface of said base member having protuberances extending therefrom and said coating being ruptured along the edges of said protuberances, said coating comprising a continuous film except at said ruptured portions.

9. An insulating material comprising a sheet of fibrous material indented to provide a plurality of protuberances on one surface thereof and a sheet of metal foil adhesively secured to said one surface, said foil being ruptured along the edges of said protuberances.

10. A laminated insulating structure comprising a plurality of membranes each of which is indented to provide protuberances on one surface thereof and a sheet of metal foil adhesively secured to said one surface of each of said membranes, said foil being ruptured along the edges of said protuberances whereby the foil on said protuberances is separated from the foil on the remainder of said membranes, said membranes being arranged in face-to-face relation with alternate membranes reversed whereby the protuberances on each membrane engage similar protuberances on an adjacent membrane to provide air-cells therebetween, said ruptures in said foil preventing the conduction of heat therealong between said protuberances and the remainder of said membranes.

11. A laminated insulating structure comprising a plurality of laminations each of which includes a fibrous base member having a thin metallic coating on one surface thereof, each of said laminations being indented to provide protuberances on the coated surface thereof and said metallic coating being ruptured along the edges of said protuberances, said laminations being arranged in face-to-face relation with alternate laminations in reversed relation so that the protuberances on one lamination engage similar protuberances on an adjacent lamination to provide air-cells therebetween, said ruptures preventing the conduction of heat along said metallic coating from said protuberances to other portions of said laminations.

12. The method of producing insulating materials which comprises adhesively securing a sheet of metal foil to an insulating base member, indenting said member to provide protuberances on the foil coated surface thereof, and thereafter removing by abrasive action the foil on the crowns of said protuberances.

13. The method of producing insulating materials which comprises adhesively securing a sheet of metal foil to an insulating base member, indenting said member to provide protuberances on the foil coated surface thereof, removing by abrasive action the foil on the crowns of said protuberances and superimposing a plurality of said indented members with the protuberant surfaces in face-to-face relation so that the foil-free crown portions on said members engage each other.

14. The method of producing insulating materials which comprises applying to one surface of an insulating base member a thin metallic coating, indenting said base member to a depth sufficient to cause rupture of said coating along the edges of the protuberances formed on said coated surface, removing by abrasive action the metallic coating on the crowns of said protuberances, and superimposing a plurality of said indented members with the crowns of the respective protuberances in engaging relation.

15. A laminated insulating structure comprising a plurality of laminations each of which includes a fibrous base member having a thin metallic coating on one surface thereof, each of said laminations being indented to provide protuberances on the coated surface thereof, said metallic coating being ruptured along the edges of said protuberances and the crowns of said protuberances being free of said coating, said laminations being arranged in face-to-face relation so that the uncoated crowns of said protuberances on one lamination engage similar crowns on an adjacent lamination, whereby an air-cell structure is provided in which metallic coatings define the air-cells and contact between the metallic coatings on adjacent laminations is minimized, said ruptures minimizing the conduction of heat along the surface of each lamination.

16. An insulating material comprising a base member and a sheet of metal foil secured to one surface thereof, said surface having a plurality of protuberances, said metal foil on the surface of the protuberances being substantially discontinuous and ruptured along the edges of said protuberances and the metal foil between said protuberances being substantially continuous.

17. A laminated insulating structure including at least two membranes having thin metallic coatings on one surface thereof and arranged in face-to-face relation, at least one of said membranes being indented to provide protuberances which engage the other membrane to form air cells between said membranes, the thin metallic coating on said one membrane being ruptured along the edges of said protuberances to prevent the conduction of heat along said metallic coating from said protuberances to the remainder of said one membrane, said coating comprising a continuous film except at said ruptured portions.

18. A laminated insulating structure including a plurality of membranes indented to provide protuberances on one surface thereof, said laminations being arranged in face-to-face relation with alternate laminations in reversed relation so that the protuberances on one lamination engage similar protuberances on an adjacent lamination to provide air cells therebetween, at least some of said laminations having on said one surface thereof a thin metallic coating which is ruptured along the edges of said protuberances, said ruptures preventing the conduction of heat along said metallic coating from said protuberances to other portions of said laminations.

THEODORE B. SLISZ.
CLYDE C. SCHUETZ.